US008600361B2

(12) United States Patent
Fraccaroli

(10) Patent No.: US 8,600,361 B2
(45) Date of Patent: Dec. 3, 2013

(54) MOBILE COMMUNICATIONS MATCHING SYSTEM

(75) Inventor: Federico Fraccaroli, Irving, TX (US)

(73) Assignee: Nokia Corporation, Espoo (FI)

( * ) Notice: Subject to any disclaimer, the term of this patent is extended or adjusted under 35 U.S.C. 154(b) by 2 days.

(21) Appl. No.: 13/109,612

(22) Filed: May 17, 2011

(65) Prior Publication Data

US 2011/0217992 A1  Sep. 8, 2011

Related U.S. Application Data

(63) Continuation of application No. 11/868,004, filed on Oct. 5, 2007, now Pat. No. 7,970,390, which is a continuation of application No. 10/412,689, filed on Apr. 14, 2003, now Pat. No. 7,280,822, which is a continuation of application No. 09/382,328, filed on Aug. 24, 1999, now Pat. No. 6,549,768.

(51) Int. Cl.
*H04L 29/06* (2006.01)
*H04Q 7/22* (2006.01)
*H04Q 7/38* (2006.01)

(52) U.S. Cl.
USPC .................. 455/414.3; 455/414.1; 455/414.2; 455/445; 455/456.1; 455/456.5; 455/517; 455/518

(58) Field of Classification Search
USPC ..................... 455/414.1–414.4, 456.1–456.6, 455/457–460, 435.1–435.3, 436–439, 445, 455/517–519
See application file for complete search history.

(56) References Cited

U.S. PATENT DOCUMENTS 5,086,394 A * 2/1992 Shapira .......................... 705/319
5,432,542 A * 7/1995 Thibadeau et al. ............. 725/35

(Continued)

FOREIGN PATENT DOCUMENTS

BE  1010909  3/1999
CA  2241711 A1  12/1998

(Continued)

OTHER PUBLICATIONS

Agents for Expertise Location, Vivacqua, Adriana S., AAAI Technical Report SS-99-03, American Association for Artificial Intelligence, 1999, https://www.aaai.org/Papers/Symposia/Spring/1999/SS-99-03/SS99-03-003.pdf, pp. 1-5.

(Continued)

*Primary Examiner* — Tuan A Tran
(74) *Attorney, Agent, or Firm* — Ditthavong Mori & Steiner, P.C.

(57) ABSTRACT

A wireless communications network comprises a server in a central location storing matching profiles for a plurality of users of the network. The matching profile for each user is stored in the server through the user's mobile unit or a secure page on the Internet. Each matching profile is corresponded with a respective mobile unit using the same identification information (ID) of the respective mobile unit utilized for carrying out phone calls. The server has a customizable variable matching algorithm and probes the matching profiles corresponding to the respective mobile units in a cell or group of cells for a match every time a new mobile unit subscribes into the cell or group of cells. When there is a match of matching profiles, the two persons are put in contact or advised of each other through a phone call or other communications method.

20 Claims, 2 Drawing Sheets

(56) References Cited

U.S. PATENT DOCUMENTS

| | | | | |
|---|---|---|---|---|
| 5,832,381 | A | * | 11/1998 | Kauppi ........................ 455/432.1 |
| 5,918,181 | A | * | 6/1999 | Foster et al. ................ 455/456.1 |
| 5,963,951 | A | * | 10/1999 | Collins ................................. 1/1 |
| 6,052,122 | A | * | 4/2000 | Sutcliffe et al. ................ 715/751 |
| 6,061,681 | A | * | 5/2000 | Collins ................................. 1/1 |
| 6,256,503 | B1 | * | 7/2001 | Stephens ..................... 455/456.6 |
| 6,549,768 | B1 | * | 4/2003 | Fraccaroli ................... 455/456.3 |
| 7,280,822 | B2 | * | 10/2007 | Fraccaroli ................... 455/414.3 |
| 7,970,390 | B2 | * | 6/2011 | Fraccaroli ................... 455/414.3 |

FOREIGN PATENT DOCUMENTS

| | | |
|---|---|---|
| DE | 19732574 A1 | 2/1999 |
| DE | 299 04 686 U1 | 6/1999 |
| EP | 071545 A1 | 6/1996 |
| EP | 0795991 | 9/1997 |
| EP | 0 699 330 B1 | 4/1998 |
| EP | 0853287 A2 | 7/1998 |
| EP | 1434459 A2 | 6/2004 |
| WO | WO 97/16934 | 5/1997 |
| WO | WO 98/21913 A2 | 5/1998 |
| WO | WO 99/11078 A1 | 3/1999 |
| WO | WO 00/11793 A1 | 3/2000 |
| WO | WO 00/19344 | 4/2000 |
| WO | WO 00/30379 A1 | 5/2000 |
| WO | WO 01/15480 A1 | 8/2000 |

OTHER PUBLICATIONS

European Office Action for Application No. 04100550.5, Aug. 8, 2005, pp. 1-5.
European Search Report for Application No. 04100550.5 completed Jun. 30, 2004.
International Preliminary Examination Report for International Application No. PCT/US00/22533, Nov. 16, 2001, pp. 1-7.
International Search Report for International Application No. PCT/US00/22533, Apr. 12, 2000, pp. 1-6.
Jessica E. Vascellaro, "Mobile Dating," The Wall Street Journal online, downloaded on Jul. 11, 2007, from <http://finance.yahoo.com/family-home/article/103099/mobiledating>.
Martin Kropat, "Mobile Dating," Siemens Technology Report, vol. 2, No. 3, Apr. 1999.
Office action for parent U.S. Appl. No. 11/868,004 dated Jun. 28, 2010, pp. 1-11.
Office action for related U.S. Appl. No. 12/553,308 dated Sep. 17, 2010, pp. 1-16.
Office action for related U.S. Appl. No. 13/109,612, Jul. 29, 2011, pp. 1-11.
Print out of Website page at <http://www.bestdate.com> dated Mar. 24, 1999, pp. 1-4.
Print out of Website page at <http://www.design.philips.com> dated Mar. 25, 1999, 1 page.
Qualcomm CDMA Technologies, "gpsOne for Community," downloaded on Jun. 27, 2009, from <http://www.cdmatech.com/locationservicesshowcase/community.jsp>, pp. 1-5.
Written Opinion for International Application No. PCT/US00/22533, Jul. 27, 2001, pp. 1-6.
Partial European Search Report for related European Patent Applicatio4 n No. 10 18 4472.8 dated Aug. 2, 2012, pp. 1-9.
Extended European Seach Report for European Application No. 10184525.3 dated Mar. 20, 2012, pp. 1-7.
Kropat, M., Mobile Dating, Siemens, Technology Report, Apr. 1, 1999, vol. 2, No. 3, pp. 122-124, XP07001828.

* cited by examiner

MOBILE COMMUNICATIONS MATCHING SYSTEM

PRIORITY CLAIM

This application is a continuation of and claims the benefit of U.S. patent application Ser. No. 11,868,004, filed Oct. 5, 2007, which is a continuation of Ser. No. 10/412,689, filed Apr. 14, 2003, which in turn is a continuation of and claims the benefit of U.S. Pat. No. 6,549,768, filed Aug. 24, 1999; the entire contents of both which are incorporated herein by reference.

BACKGROUND

1. Field of the Invention

This invention relates generally to computerized methods and systems for providing location-sensitive services in conjunction with a wireless communications network. A particular aspect of the present invention relates to a computerized method and system of matching persons through their mobile stations on the network.

2. Description of the Related Art

In general, telephone calls over a wireless communications network must be initiated by a user who dials another person's phone number. Although the calls may be subsequently forwarded to different phone numbers using call forwarding, etc., without the caller's knowledge, the caller usually must know the phone number of the person he or she wishes to call and must initiate the call. See, for example, U.S. Pat. No. 5,610,972 to Emery et al. There is no known method or system for matching persons on a wireless network.

Several methods and systems currently exist for generally matching people having similar interests or other reason for willing to be put in contact with each other. For example, computer dating services match people using a large database having a profile for each one of their customers. Each customer's profile contains personal information such as age, race, marital status, gender, sexual orientation, religion, height, weight, color of eyes and/or hair, smoking habits, education, interests, etc. This matching profile is used to match the customer with others. In addition to their own matching profile, each customer can also submit a request which contains their preferences for a match with the matching profiles of other customers. In response to the request, the computer dating service searches the database for matching profiles which match the preferences in the request and then informs the requesting customer of the selected matches, if any. The match is typically recorded by some sort of a printed report.

Similar computer dating services currently exist on the Internet. These services receive profile data and display information over the Internet and contact their customers via e-mail. They also may give their customers screen names so that matched persons can initially correspond with each other via e-mail without revealing their identities. An example of such an Internet dating service is BestDate.com. (The date on which BestDate.com was first publicly used is not known and is not admitted to be prior art.)

Unfortunately, there is a lack of immediacy to such computer dating services. Although geographical information such as each person's address is stored and a matching request can specify a geographical area, the dating services cannot ensure that a person is located in the requested geographical area at the day or time of the request or that the person is available and desires to be matched at the time of the request.

There is also a problem that matches are only selected in response to a request therefor from a customer.

A possible real-time alternative is a wearable device which detects when another similar device is nearby. For example, Phillips Electronics N.V., has proposed so-called "hot badges" which are pre-loaded with personal information. It is described that the badges signal each other when they store similar personal information and are within short radio range of each other. It is apparently intended by the short radio range that the wearers will be close to each other and can initiate a conversation with each other. These hot badges appear to be conceptual and futuristic in nature and not adequately disclosed in the manner necessary for one to design and manufacture the badges.

Belgium Patent Application No. 09700119 filed by Linda van Cappellen appears to describe similar devices. However, these devices also suffer the disadvantages that they have a limited radio range and must contain enough memory to store the personal information and the processing circuitry necessary to operate the device and to determine whether nearby devices store similar personal information.

BRIEF SUMMARY

An exemplary embodiment of the present invention is directed to initiating contact through the handset of a person in a manner sensitive to the location of the person in a cell or other area of a wireless communications network. In a particular aspect of the invention, persons are matched with each other.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the claims in the patent issuing from this application.

DETAILED DESCRIPTION

Figure 1:
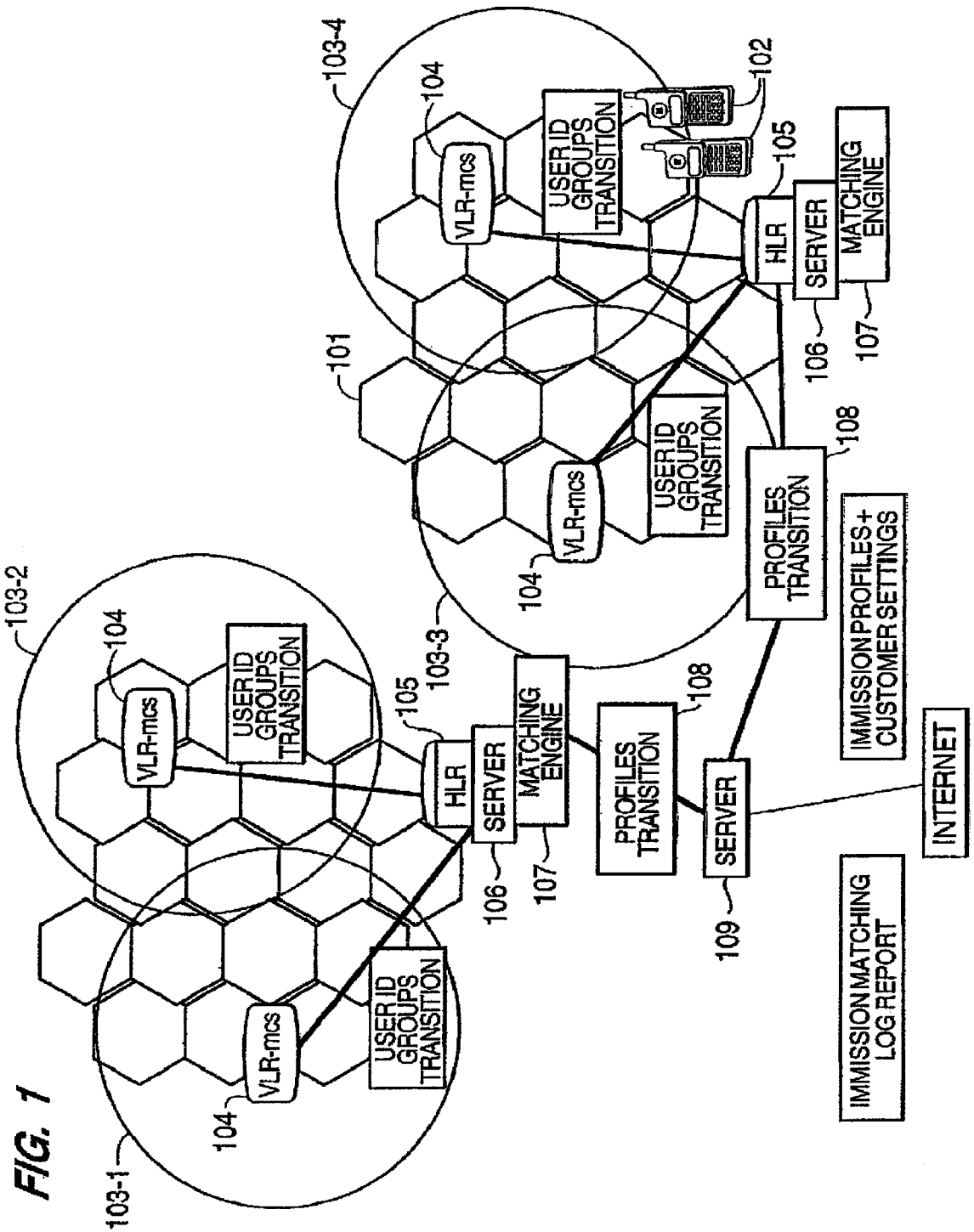
FIG. 1 is a generalized block diagram providing a basic illustration of the major elements of a cellular network in which an exemplary embodiment of the invention can be implemented.

An exemplary embodiment of the present invention seeks to provide a method of initiating contact between persons utilizing a wireless communications network on the basis of their physical location and the similarity of information which they have stored in the network. In one possible application of the invention, contact is initiated between people who don't personally know each other but who have both indicated an interest in meeting, or at least being put in contact with, other people with similar interests. In another possible application of the invention, contact is initiated between people who might know each other but who don't know that they are both present at the same time in a certain area and who have indicated a willingness to be put in contact with each other when they are in a certain area at the same time.

The invention is not limited to these embodiments. It is more broadly directed to a diverse set of useful, helpful and information services in a mobile terminal utilizing basic location information. It improves any existing or forthcoming service by utilizing basic location information through the network as an immediate answer to the "Where am I?" question.

An exemplary embodiment of the invention can be incorporated into a GSM cellular phone network. Such a system has a plurality of cells which transmit calls to and from mobile stations. Although the GSM system is a preferred implementation of an exemplary embodiment, the invention is not limited in its implementation to the GSM cellular radio network disclosed in this application or any other cellular network such as, for example, a code division multiplex access (CDMA) system, Nordic Mobile Telephone (NMT) system, DCS 1800, Personal Communication Network (PCN), Universal Mobile Communication (UMC), Universal Mobile Telecommunication System (UMTS), or Future Public Land Mobile Telecommunication System (FPLMTS), etc. Indeed, the various embodiments of the invention are generally useful for any wireless communication network having, or hereafter developed to have, a location capability. Presently available and future capabilities of location services will enable different embodiments of this invention. For example, an embodiment of the invention may be used in a PCS system, a microcellular system or a wireless local area network (WLAN) such as bluetooth to provide location-sensitive information. A bluetooth embodiment could be used, for example, in a museum or other building so that, when a person is standing in an area in the vicinity of an object of interest, information concerning the object is automatically provided or provided upon request to the mobile station of that person. As the person moves from one area to another area, different information is so provided.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention.

In the application of the exemplary embodiment to a GSM network illustrated in FIG. 1, the geographical area covered by a cellular network is divided into smaller separate radio areas called cells. (While shown in FIG. 1 as non-overlapping hexagons, in practice, the cells are partially overlapping circles or ellipses.)

When in a cell 101, a mobile radio station, preferably a handset 102, communicates with the network via a fixed radio station, called a base station (not shown), located in cell 101. Each base station communicates by means of a bi-directional radio link with the mobile radio stations in the corresponding cell. For clarity's sake, FIG. 1 shows only two handsets next to service area 103-4, it being understood, as known in the art, that there may be thousands of mobile stations which may travel freely from any cell 101 to another and between and among service areas 103-1 to 103-4.

In the cellular radio system shown as an example in FIG. 1, each service area 103 has its own VLR-msc 104. Merely for purposes of illustration, four service areas are provided in FIG. 1, each of which comprises a respective VLR-msc 104. For each VLR-msc 104, one or more base station controllers BSC (not shown) are provided, controlling several base stations. Each base station controller controls the base stations of a number of adjacent cells 101.

The cellular radio network must know the cell 101 in which the mobile radio station is located in order to be able to route calls to it. The process by which the cell location of mobile stations is made known to the cellular system is referred to as registration. Some cellular systems also use registration of mobile stations as a means to, for example, page the mobile stations for reasons other than routing calls or to balance the load between the access channel and the paging channel. Without any type of registration, mobile stations would need to be paged over the entire cellular system, resulting in the transmission of a number of pages per call delivery equal to the number of base stations in the system. Registering a mobile station every time it moves to the coverage area of a new base station thus substantially reduces the number of pages per call delivery.

The exact details of the registration method used in a cellular system is determined as a function of various parameters such as the cellular system size, the expected mobility of mobile stations within the system, and call delivery statistics or predictions. Since cellular systems can vary substantially with respect to these parameters, the specifications for CDMA and GSM systems allow for multiple different registration procedures. The different registration procedures can be independently enabled or disabled to allow any subset of registration methods to be tailored to optimize the use of a cellular system.

Although the registration procedures can vary, in a typical implementation, the base stations of the cellular network constantly broadcast information on themselves or their neighborhood, such as base station identifier BSI, base station type identifier BSTI and so-called neighboring cell information. On the basis of neighboring cell information broadcast by a respective base station, a mobile station registered in a cell 101 served by that base station recognizes those neighboring cells 101 the base-station transmission of which the mobile station should monitor. When the signal strength of the current base station weakens, the mobile station registers into the best of these monitored neighboring base stations (e.g. the one for which, from the viewpoint of the mobile station, the signal strength is then currently the strongest).

Cells 101 can be organized into groups of cells, each group of cells being identified by a cell group identifier. Each base station that is in communication with a mobile station uses the cell group identifier to indicate to that mobile station the group of cells to which the base station belongs. If the mobile station observes that the cell group identifier changes as the base station is changed, i.e. that the group of cells changes, the mobile station initiates a location updating by transmitting a location updating request to the cellular radio network. If the location area does not change when the base station changes, no location updating is carried out by the mobile station.

The location updating for each mobile station preferably initiates subscriber data updating of the respective subscriber in a subscriber location register(s) of the cellular network. For instance, the exemplary cellular radio network shown in FIG. 1 includes home location registers (HLR) 105, visitor location registers and mobile switching center (VLR-msc) 104, and base station controllers (BSC)(not shown) connected to the base stations of the network. The location area data of the subscriber is stored in a visitor location register of the respective VLR-msc 104, and an HLR 105 communicates with that respective VLR-msc 104 in order to receive the location area data indicating the cell and cell group where each subscriber is located.

In a preferred embodiment, each individual handset is identifiable by unique identification information (USER ID). For example, in GSM or TDMA systems, there is a registration of the handset within the base station which relates to one base station or group of base stations depending on the network configuration. However, usually the registration of the handset can generally be forced to one base station. When the handset registers into the base station, the ID of the handset can be sent to the MSC and formed into groups of mobile stations registered in the same base station. These groups of mobile station IDs can be sent to the HLR 105 and its respectively co-located server 106. This server 106 performs the function of trying to match and couple the profiles belonging to the same groups of IDs (located in the same base station area) together using matching engine 107.

The USER ID of each handset is stored in a variable location register of the respective VLR-msc 104, along with the cell and cell group of the location of each handset, in its respective service area 103. This information, as well as transition data, can be transferred from each VLR-msc 104 to its corresponding HLR 105 where corresponding server 106 is located.

Consequently, each corresponding HLR 105 of the cellular radio network knows the location of each active mobile radio station within an accuracy of an area consisting of one cell, this area generally being called a location area. This cell and cell group are provided to server 106 for each mobile station and is stored in the matching profile for the corresponding USER ID.

In an exemplary embodiment of the invention, each HLR 105 has a server 106 with a matching engine 107. (Although shown simply as a block in FIG. 1 for the sake of simplicity, matching engine 107 is preferably composed of software executing on server 106.) Each server 106 receives and stores matching profiles for each USER ID corresponding to an active mobile station in service area 103. Preferably, the matching profile is retrieved and stored by server 106 when the mobile station first becomes active in service area 103 and is maintained as long as the mobile station remains active in service area 103.

The matching engine 107 implements a matching algorithm by carrying out a comparison of matching profiles for each USER ID having equivalent cell or cell group information. For example, the matching may be performed only for profiles which are in the same cell or it may be performed for profiles which are in the same cell group. The location area may be expanded into any one of a number of different location area sizes comprised of a plurality of cells as disclosed in U.S. Pat. No. 5,832,381 to Kauppi, the disclosure of which is hereby incorporated by reference in its entirety.

In a preferred embodiment, the location area is reduced in size to be smaller than a single cell. This embodiment is especially advantageous when implemented with wideband CDMA handsets complying with Federal Communications Commission (FCC) requirements for the handling of 911 emergency calls by cellular system operators. The FCC requirements utilize a combination of location services and 911 emergency services so that a user is able, by pushing a button on the handset, to make their location promptly available to the police or other appropriate personnel within an accuracy of about 125 meters. This is a natural extension for the Enhanced 911 (E911) system for fixed phones in the United States.

The FCC requirements state that by Oct. 1, 2001 the system operators must be able to identify the latitude and longitude of a mobile unit making a 911 call within a radius of no more than 125 meters in 67 percent of all 911 emergency calls, using Root Mean Square calculations (success rate approximately 67 percent). The system operators must process and transmit to the appropriate PSAP (Public Services Answering Point) emergency center all 911 calls made from a wireless mobile station, including calls initiated by a roaming mobile station or a mobile station without authentication. At the same time, the information of a caller's Automatic Number Identification (ANI) and the location of the base station or cell site must be relayed to the designated PSAP. Also, call-back and tracking of emergency 911 calls is required and the processing and connection of emergency 911 calls have highest priority.

The telecommunications standardization bodies in Europe (ETSI) and Japan (ARIB) have set their own requirements on location services. ETSI specification UMTS 22.05, version 3.2.0, states requirements for location features in UMTS: "Location features shall also be supported, to allow new and innovative location based services to be developed".

In Japan and other countries in the Far East, navigation services have become very popular. The addressing style in Japan is unclear since there are no geographically logical addresses, no street names or numbers, and no cumulative building and apartment numbers. Blocks of houses are named and houses within the block are numbered according to the order of construction. So even local people are often as lost as foreigners in their neighboring city.

Car navigation systems, traffic telematic and handheld GPS receivers are now commercially available. However, the GPS positioning system is not ideal in Japan and other urban areas because most buildings are very tall and a lot of urban and especially suburban traveling is made by subway. In both of these cases, the GPS satellite signals are often blocked.

The realization of a positioning service in the invention can be determined by any one of several different methodologies: network-based positioning, mobile-based positioning, or a hybrid position architecture. The most straight forward method for obtaining location information where the location area size is smaller than the area of one cell is a network-based positioning method using triangulation of base station signals on the ground since triangulation does not require any modification of the mobile station. One possible method of using triangulation to achieve a position fix in a UMTS cellular network measures the strength of the signal coming from the different base station pilot signals.

However, handsets in GSM and other so-called 2.sup.nd generation cellular systems are presently required to be capable of providing information about the user's location and thus facilitate mobile-based positioning. Such a capability is also expected to be included in most 3.sup.rd generation handsets in conjunction with emergency 911 services. These handsets use location methods other than triangulation, such as adoption of a global positioning system (GPS) receiving device, to determine, or assist in the determination of, location. GPS is more accurate than triangulation systems and requires less computational power. But incorporating GPS into a handset carries the aforementioned drawback that GPS doesn't work within rooms and houses and outside the line of sight of some satellites.

Although numerous implementations of location capability in the handset are possible, the location implementation is preferably autonomous so that the handset itself can ask for its location or the location of the handset can be requested by a base station and supplied by the handset in response to the request. In any event, the location information so obtained is associated with the USER ID and can be automatically sent to the base station during handset registration or whenever the USER ID information is sent to the base station. Alternatively, the location information can be delivered to the base station when it is requested irrespective of handset registration or transmission of the USER ID. In the exemplary embodiment shown in FIG. 1, the location information is then transferred to HLR 105, provided to server 106 for each mobile station and stored in the data profile for the corresponding USER ID.

In addition to the decision to provide location services for an area smaller than a cell, the network operator can also choose the precision of the location services, with the location precision even varying from one part of the network to another. For example, it may be chosen to be hundreds of meters in some places and as accurate as 5 meters in other places. It should be possible to specify the area as a circular zone (center and radius) up to the highest resolution made possible by the accuracy capability of the part of the serving network where the user is registered. This accuracy can be improved by the usage of higher frequencies in the network which will shrink the size of the cells. The achievable accuracy also varies from place to place in different environments. It is preferred that a minimum precision of around 50 meters be achieved in all types of environments.

It is preferable that the precision of the location can be dynamically determined by the network operator. The network operator preferably may be able to set the precision requirement to vary from one part of the network to another. The location precision may also be determined by the particular application or service and is one of the network operator selectable Quality of Service (QoS) parameters.

The location method is preferably, but not necessarily, independent of mobile station status so that there is a location fix even when the mobile is idle. Several other design features, such as adaptive antenna technique, path loss estimation technique, etc., are optional in order to allow the network operator to conduct a service effectively.

The mobile station user shall preferably be able to restrict access to the location information (either permanently or on a per call basis). The restriction can preferably be overridden by the network operator when appropriate (e.g., emergency calls).

It is also preferably possible to optionally set the frequency of position information updates in applications where the location information is automatically and repeatedly provided or the amount of delay experienced before location information is received in applications where there must be a specific request for location information. The frequency of the information update or delay in providing location information will of course influence the performance of the network. It is preferred that there be a minimal delay for the preferred automatic matching embodiment described in this application.

In a UMTS network, location information can be categorized to two levels of accuracy. The basic level of location information is what the network obtains without extra signaling from the mobile station. The advanced level of location information is obtained through extra signaling.

A locations services server is preferably provided in the network to obtain the horizontal location of the calling mobile station in terms of universal latitude and longitude co-ordinates. The location services in the network preferably allow a location services client to specify or negotiate the required horizontal accuracy. The location services client shall preferably normally attempt to satisfy or approach as closely as possible the requested or negotiated accuracy when other quality of service parameters are not in conflict. To provide for more stringent service requirements, the location services server may provide higher accuracy. The locations services server provides the location service capabilities but the mechanism by which location information is reported to a location services client is dependent on the desired performance of the application or service as described above.

Specific details of another location method suitable for use in an embodiment of the invention are described by Draft Location Parameters and Message Structure—Ver 2.0, Location Parameters Ad Hoc Group, Mar. 15-19, 1999 and the website of the US Wireless Company (www.uswcorp.com/USWCMainPages/laby.htm).

Preferably, the handset used in a mobile-based positioning method embodiment of the invention is a combination of GPS and trilateration—(time of arrival measure of the signal coming from the different base stations) in the handset. The handset operates in a dual mode system in which GPS is normally used and trilateration (time of arrival measurement or difference of time of arrival measurement) is used instead if GPS is not available with full accuracy because, for example, the handset is inside a building.

In any event, in an embodiment having a location area size less than the area of a cell, instead of searching for a match between two handsets which are within the same cell or cell group, matching engine 107 is programmed and controlled using, for example, software stored with server 106, to search for handsets where the difference between the position of the handsets is below a certain threshold, and then triggers the matching algorithm for matching the profiles of the two corresponding USER IDs.

Server 109 has two main operations. First, it operates as an Internet server such as that typically utilized for providing web pages. The matching profile (the characteristics of the service subscriber such as business interests, personal interests, identity information of people whose proximity he wants to be aware of and put in contact with if close enough, etc.) and requests for matches (interests and characteristics of people whose proximity will trigger the request for communication or a simple message) are created for each user of the cellular network and stored, at least initially, in server 109 along with information identifying the user in the cellular network. The matching profile may range from very generic common interests to the specific identity of known persons. This identity information may or may not include the USER ID corresponding to the user that is utilized in the cellular network. A user's interaction with their respective profile and related information in the form of a secure internet page is supported by their handset. The handset having integrated browsing capabilities or by a separate browser such as Internet Explorer or Netscape Navigator to be accessed through a secure page by any personal computer with access to the secure internet page. In either instance, the contents of an exemplary Internet user page is shown in FIG. 2.

Figure 2:
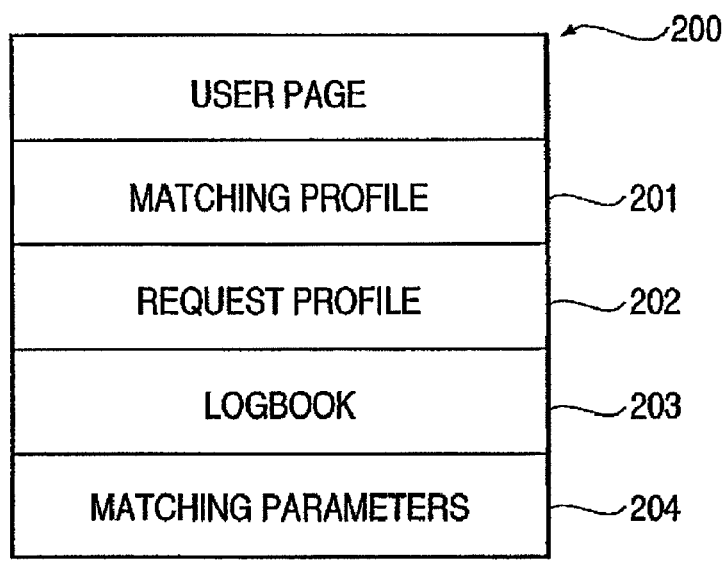
FIG. 2 is a table illustrating the profile and other information of a user page suitable for use in the exemplary embodiment.

The matching profile 201 in FIG. 2 is not limited to those items discussed above with relation to a dating service. In particular, matching profile 201 may have just a few simple fields. For example, the invention could be applied in the situation of a large number of people attending a convention or other large event at the same convention center or other meeting place. The matching profile 201 could have a simple field identifying the user as one of the persons attending the event. The matching system could be set up to identify those persons once they enter the location area surrounding the convention center so that they are "matched" with the information center or registration desk of the convention who can in turn provide assistance. In this application, there is no need for extensive personal information, however the information provided for the user is still referred to as a "matching" profile for the purposes of this application.

Another example embodiment of the invention automatically establishes communication with the closest friend or other person with whom there is a match using a matching algorithm. This embodiment essentially operates only upon a user's request rather than automatically and sequentially expands the matching area to larger and larger areas from the user's location until the first match is gained. The expansion can consist of expanding the group of cells. Alternatively, the area can be expanded by increasing the threshold matching distance. In such a case, the simple difference in location of two mobiles will give a distance between them which can be used as the basis for expansion. The distance can be used as an initial threshold distance between two mobiles in any embodiment to trigger the matching algorithm or to expand the matching area.

Request profile 202 likewise need not include personal information. The use of request profile 202 is disclosed elsewhere in this application.

Logbook 203 can store each of the matches that have previously occurred for that user. Each entry of the logbook can contain all of the information provided to the user in the message signal informing them of the match as described in detail below. This information may contain the matching profile of the other person with whom the user is matched and the criteria or algorithm by which the match occurred. Preferably, the logbook automatically stores the time, date and location of the match and provides the user with an electronic journal in which notes and comments can be entered concerning the match. The log book can preferably be operated by the user so that a certain match should be disregarded in the future. With such a feature, each match is cross-checked against the logbook of the handset and the match is announced to the user only if the logbook does not indicate that the match is disapproved by the user.

Matching parameters 204 allows the user to specify the constraints for stating when matching should be attempted. These parameters differ from the request profile 202 which includes the information to be used when performing the matching algorithm. These parameters typically would specify the location area size the user desires (cell, group of cells, etc) and the time at which matching should be attempted (for example, prohibiting matches between 9 a.m. and 5 p.m.)

At some point in time, HLR 105 provides a request to server 109 for the matching profiles of each user as described above. Preferably, the request from HLR 105 is made as soon as the user is registered in HLR 105. The matching profile (and request profile, including preferences) for the user is read out of server 109 in response to the request, reformatted in profiles transition 108, and stored in server 106 corresponding to the requesting HLR 105. The matching profile of the newly added user is then compared with the respective matching profiles of the other users located in the same location area (which may be a cell, group of cells, or location area less than the area of a cell) as the newly added user. For users providing a request profile, the matches are conducted using the preferences in the request profile. Otherwise, a matching algorithm provides select matches using a standard matching algorithm. In any event, the matching process is carried out automatically and in real-time whenever the user enters a new location area (through registration of the user ID in HLR 105) without there being any action necessarily required by the user at that time. From the perspective of the user, their handset is constantly and automatically scanning for matching opportunities each time they enter a new location area. In an alternative embodiment, the user has the option to enable or disable matching by a simple input process using the handset. However, even in such an embodiment the user only needs to submit their matching profile and request profile once, and it appears that their profile follows them as they travel throughout the network. However, ii is highly preferable that, in no case at the occurrence of a match, will the actual telephone number be exchanged automatically between two people not knowing each other without each of their permission.

In an alternative embodiment, the servers 106 can be deleted and the respective matching engines 107 can be associated with server 109 instead of with servers 106. This embodiment expands the range of a single matching engine so that it can be, for example, national or international in range and also avoids the need to install separate servers at each HLR 105. In such an embodiment, each HLR 105 checks the USER ID of each user in its service areas 103 and forwards the USER ID to server 109 where matching is to be performed for that USER ID. Such an embodiment is optimal for a matching service for customers who frequently travel to different cities or countries and wish to be matched with others in that city or country who have similar interests. Depending on the amount of traffic and matching performed, there may be too much processing required for a single matching engine 107, in which case, the matching engine will be distributed as exemplified in the embodiment shown in FIG. 1. The distributed system shown in FIG. 1 is also preferable for networks in which different areas have different standards or protocols. The servers 106 may be different from each other and the profiles transition 108 may provide different transitions so that the same common profile in Internet server 109 could be provided to different networks.

In any of the above described embodiments, when a match is made in the matching engine, information identifying the two USER IDs matched is sent to home location register 105 and is then forwarded to VLR-msc 104 corresponding to the location area in which the mobile stations are located. (In the event that the location area includes cells corresponding to the service areas of more than one VLR-msc 104, then the information is sent to each VLR-msc 104 corresponding to one of the matched mobile stations.) VLR-msc 104 then communicates with the base station corresponding to one of the matched mobile stations and informs the base station of the match. The base station then sends a message signal to the mobile station. In a preferred embodiment, the message signal is a prompt instructing the user of the mobile station of the match and prompting them to initiate a phone call with the mobile station with which they have been matched. The prompt preferably includes some characteristics of the match occurred and, only if the users have agreed, the phone numbers of the persons being matched or other information by which a phone call can be initiated with the matched person without knowing their phone number. The prompt could also include the name of the user of the other mobile station and/or information in the profile of the user of the other mobile station. In the case that a group of people already know each other, this information can be included in their matching profile and the user can be immediately informed and put in contact with any one of those people who happens to be in his matching area.

Alternatively, the message signal could provide only the information in the profile of the user of the other mobile station and a network code or other call authorization mechanism by which a phone call can be completed. In this way, the call can be completed anonymously over the network without providing the name or phone number of the other mobile station. The user has the option to immediately complete the call by responding to the prompt or storing the profile information and associated network code or other call authorization mechanism in a log book where it can be later retrieved and call completed at that time if desired.

Alternatively, although the message signal to only one of the two mobile stations has been discussed, a message signal could be sent to both of the mobile stations in either one of the variations described above so that the user of either one of the two mobile stations can initiate the call. The preferences for the mode of delivery of the message signal in the event of a match, can be decided individually by each user and stored in their respective matching profile. If permitted by each user's profile, a call could be setup and dialed automatically between the two users without the need for any further action by either one of the two users. Such an embodiment is especially preferable in an application of the invention in a local wireless LAN, such as blue tooth, where the matching of persons not previously knowing each other but having similar interests is a primary goal of those persons present in the location. Such an embodiment provides the clearest improvement in situations contemplated by the "hot badges" proposed by Phillips.

While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method comprising facilitating a processing of and/or processing (1) data and/or (2) information and/or (3) at least one signal, the (1) data and/or (2) information and/or (3) at least one signal based, at least in part, on the following:
at least one determination of a geographical location of at least a first mobile unit;
at least one determination of whether the geographical location of the at least first mobile unit is accessible by at least a second mobile unit, wherein the at least one determination of whether the geographical location of the first mobile unit is accessible by the at least second mobile is based at least in part on the distance between the first mobile unit and the second mobile unit; and
at least one determination to provide the geographical location of the at least first mobile unit to the at least second mobile unit based at least in part on the determining of whether the geographical location of the at least first mobile unit is accessible by the at least second mobile unit.

2. The method of claim 1, wherein the (1) data and/or (2) information and/or (3) at least one signal are further based, at least in part, on at least one determination to facilitate potential communication between the at least first mobile unit and the at least second mobile unit based at least in part on the geographical location of the at least first mobile unit.

3. The method of claim 1, wherein the at least one determination of whether the geographical location of the first mobile unit is accessible by the at least second mobile includes processing information stored in a profile associated with the first mobile unit.

4. The method of claim 1, wherein the (1) data and/or (2) information and/or (3) at least one signal are further based, at least in part, on the at least one determination of a geographical location of the second mobile unit.

5. The method of claim 4, wherein the (1) data and/or (2) information and/or (3) at least one signal are further based, at least in part, on at least one determination to facilitate potential communication between the at least mobile unit and the at least second mobile unit based at least in part on the geographical location of the at least first mobile unit and the geographical location of the second mobile unit.

6. The method of claim 4, wherein the (1) data and/or (2) information and/or (3) at least one signal are further based, at least in part, on at least one determination to provide the geographical location of the at least second mobile unit to the at least first mobile unit based at least in part on the determining of whether the geographical location of the second mobile unit is accessible.

7. The method of claim 1, wherein the at least one determination of the geographical location of the at least first mobile unit is performed when the first mobile unit changes geographical location, or when the first mobile unit enters a new cell providing wireless communication service for the first mobile unit.

8. An apparatus comprising:
a processor; and
a memory including computer program code for one or more programs, the memory and the computer program code configured to, with the processor, cause the apparatus to perform at least the following,
facilitate a determining of a geographical location of at least a first mobile unit,
facilitate a determining of whether the geographical location of the first mobile unit is accessible by at least a second mobile unit, wherein the facilitation of the at least one determination of whether the geographical location of the first mobile unit is accessible by the at least second mobile is based at least in part on the distance between the first mobile unit and the second mobile unit, and
facilitate a providing of the geographical location of the at least first mobile unit to the at least second mobile unit based at least in part on the determining of whether the geographical location of the at least first mobile unit is accessible.

9. The apparatus of claim 8, wherein the apparatus is further caused to facilitate potential communication between the at least first mobile unit and the at least second mobile unit based at least in part on the geographical location of the at least first mobile unit.

10. The apparatus of claim 8, wherein the determining of whether the geographical location of the first mobile unit is accessible by the at least second mobile includes processing information stored in a profile associated with the first mobile unit.

11. The apparatus of claim 8, wherein the apparatus is further caused to facilitate a determining of a geographical location of the at least second mobile unit.

12. The apparatus of claim 11, wherein the apparatus is further caused to facilitate potential communication between the at least first mobile unit and the at least second mobile unit based at least in part on the geographical location of the at least first mobile unit and the geographical location of the second mobile unit.

13. The apparatus of claim 11, wherein the apparatus is further caused to facilitate a providing of the geographical location of the at least second mobile unit to the at least first mobile unit based at least in part on the determining of whether the geographical location of the second mobile unit is accessible.

14. The apparatus of claim 8, wherein the determining of the geographical location of the at least first mobile unit is performed when the first mobile unit changes geographical location, or when the first mobile unit enters a new cell providing wireless communication service for the first mobile unit.

15. A server apparatus having a processor and software stored therein within a memory that, when executed by the server, cause the server apparatus to perform:
   facilitating a determining of a geographical location of at least a first mobile unit;
   facilitating a determining of whether the geographical location of the first mobile unit is accessible by at least a second mobile unit, wherein the facilitation of the at least one determination of whether the geographical location of the first mobile unit is accessible by the at least second mobile is based at least in part on the distance between the first mobile unit and the second mobile unit; and
   facilitating a providing of the geographical location of the at least first mobile unit to the at least second mobile unit based at least in part on the determining of whether the geographical location of the at least first mobile unit is accessible.

16. The server apparatus of claim 15, wherein the apparatus is further caused to facilitate potential communication between the at least first mobile unit and the at least second mobile unit based at least in part on the geographical location of the at least first mobile unit.

17. The server apparatus of claim 15, wherein the determining of whether the geographical location of the first mobile unit is accessible by the at least second mobile includes processing information stored in a profile associated with the first mobile unit.

18. The server apparatus of claim 15, wherein the apparatus is further caused to facilitate a determining of a geographical location of the at least second mobile unit.

19. The server apparatus of claim 18, wherein the apparatus is further caused to facilitate potential communication between the at least first mobile unit and the at least second mobile unit based at least in part on the geographical location of the first mobile unit and the geographical location of the second mobile unit.

20. The server apparatus of claim 15, wherein the determining of the geographical location of the at least first mobile unit is performed when the first mobile unit changes geographical location, or when the first mobile unit enters a new cell providing wireless communication service for the first mobile unit.

* * * * *